United States Patent [19]

Schmidt et al.

[11] Patent Number: 5,294,316
[45] Date of Patent: Mar. 15, 1994

[54] PROCESS AND APPARATUS FOR ELECTRODIALYSIS OF AN ALKALI SULFATE CONTAINING AQUEOUS SOLUTION

[75] Inventors: Heinrich Schmidt, Vöcklabruck; Christoph Boxan, Lenzing; Arnold Verwanger, Schörfling; Reinhard Holzinger, Regau; Hans Kalleitner, Schörfling; Jamal Salim, Timelkam, all of Austria

[73] Assignee: Lenzing Aktiengesellschaft, Lenzing, Austria

[21] Appl. No.: 15,322

[22] Filed: Feb. 9, 1993

Related U.S. Application Data

[63] Continuation of Ser. No. 809,840, Dec. 18, 1991, abandoned, which is a continuation of Ser. No. 598,239, Oct. 15, 1990, abandoned.

[30] Foreign Application Priority Data

Oct. 31, 1989 [AT] Austria ............................ 2507/89

[51] Int. Cl.$^5$ .............................................. B01D 61/44
[52] U.S. Cl. ................................. 204/182.4; 204/104; 204/301
[58] Field of Search .................... 204/182.4, 104, 301

[56] References Cited

U.S. PATENT DOCUMENTS

| | | | |
|---|---|---|---|
| 4,486,283 | 12/1984 | Tejeda | 204/182.4 |
| 4,504,373 | 3/1985 | Mani et al. | 204/182.4 |
| 4,536,269 | 8/1985 | Chlanda et al. | 204/182.4 |
| 4,552,635 | 11/1985 | Jenczewski et al. | 204/182.4 |
| 4,592,817 | 6/1986 | Chlanda et al. | 204/182.4 |
| 4,629,545 | 12/1986 | Mani et al. | 204/182.4 |
| 4,740,281 | 4/1988 | Chlanda et al. | 204/151 |

FOREIGN PATENT DOCUMENTS 0096239 12/1983 European Pat. Off. ...... B01D 13/02

Primary Examiner—John Niebling
Assistant Examiner—Arun S. Phasge
Attorney, Agent, or Firm—Brumbaugh, Graves, Donohue & Raymond

[57] ABSTRACT

There is disclosed a process for the electrodialysis of alkali sulfate-containing aqueous solutions in stages, by conducting these solutions through a plurality of electrodialytic cells operating in series. The electrodialytic cells include acid and base compartments and a cation exchange membrane. The alkali sulfate-containing aqueous solutions exclusively are conducted through acid compartments of the electrodialytic cells. The electrodialytic cells exclusively possess cation exchange membranes in their interiors and are delimited by bipolar ion exchange membranes.

3 Claims, 2 Drawing Sheets

PROCESS AND APPARATUS FOR ELECTRODIALYSIS OF AN ALKALI SULFATE CONTAINING AQUEOUS SOLUTION

This application is a continuation of application Ser. No. 07/809,840, filed on Dec. 18, 1991, now abandoned, which is a continuation of application Ser. No. 07/598,239 filed Oct. 15, 1990, now abandoned.

This invention relates to a process for the electrodialysis of alkali sulfate-containing aqueous solutions in stages, by conducting these solutions through a plurality of electrodialytic cells operating in series and comprising acid and base compartments and a cation exchange membrane, as well as to apparatus for carrying out the process.

BACKGROUND OF THE INVENTION

Sulfate-containing aqueous solutions incur as waste products in the various chemical-industrial processes. Disposal of such solutions is necessary. At present, they usually are evaporated for this purpose, the salts being used in other applications, if possible, in the solid state after comprehensive purification and drying procedures.

With an environment-conscious process control, the chemical circulation ought to be closed by recycling the sulfates into the primary process. For instance, in the xanthogenate process, this would mean that the spent spin bath liquor must be re-processed to sulfuric acid and lye so as to be able to recycle the sulfuric acid to the preparation of fresh spin bath liquor and the lye to the production of xanthogenate.

Attempts have been made for years to develop an electrolytic process by which such processing is feasible in a cost-saving manner. In SU-A - 701 961, for instance, a process is described according to which the splitting of sulfate is effected by aid of a three-compartment electrodialyzer. That is an electrolytic apparatus subdivided into three compartments by an anion and a cation exchange membrane, in which $Na_2SO_4$ is electrolytically split into the splitting products $H_2SO_4$ and NAOH, each in the form of an aqueous solution. The $Na_2SO_4$ solution is fed into the intermediate compartment and the more or less concentrated output solutions are drawn off the respective electrode space.

An electrodialyzer of similar structure is described in DE-A- 3 529 649, in which, however, no pure $Na_2SO_4$ solutions in water, but $Na_2SO_4$ and $H_2SO_4$-containing solutions, as they incur, e.g., in the viscose fiber industry, are electrolyzed. The $Na_2SO_4$-containing solutions either are conducted in total into the intermediate compartment and from there into the anode compartment or are divided into two partial streams, which are fed into the two chambers simultaneously and then are united again.

However, the impurities contained in the spin bath liquor to be processed make both the membranes and the anodes last extremely short. Thus, for instance, the cathode-side membrane gets irreversibly damaged already within a few weeks due to a content of calcium ions that cannot be eliminated from the acidic solution by means of cation exchangers, which results not only in an increase in the voltage and a drop of the current efficiency, but also in a strongly growing permeability to sulfate ions.

Moreover, even the expensive electrocatalytic coating of the anode is attacked by a high concentration of organic impurities that cannot be removed to a sufficient extent, neither by commercially available activated carbons nor by adsorptive resins, which is reflected in an initially slow, then rapidly increasing rise in the voltage.

To electrolyze solutions containing $Na_2SO_4$, $H_2SO_4$ and alkaline earth ions, a process is known from EP-A 0 124 087, which is operated with a three-compartment cell consisting of two cation exchange membranes. In this electrolytical apparatus, the anode space is separated from the intermediate compartment by a cation exchange membrane and not by an anion exchange membrane as is the case with the above-described electrodialyzers. Electrodialysis is performed in a manner that the solution to be processed solely is fed into the anode chamber, while $Na_2SO_4$ solution free of alkaline earth ions is introduced into the intermediate chamber. However, because of the alkaline earth ions (mostly $Ca^{2+}$ and $Mg^{2+}$) continuously penetrating through the cation membrane from the anode side, the constant purification of this intermediate chamber solution, which serves as a buffer, is required. Such a purification step has proved rather expensive.

A special form of the electrodialysis of $Na_2SO_4$ solutions is described in EP-B - 0 096 239, according to which the water splitting basically required for salt splitting is effected not on electrodes, but on bipolar ion exchange membranes. These are laminates each comprised of a cation and an anion blocking layer, which allow for the progressive dissociation of water into $H_3O^+$ and $OH^-$ ions in the electric field. Since this process does not involve the potential-consuming electrode procedures inherent in the simultaneous formation of $H_2$ and $O_2$, the bipolar membrane process is operated at a considerably lower current consumption than electrolysis.

In accordance with the mode of functioning of the bipolar membrane, the electrochemical cells are delimited by bipolar membranes instead of electrodes, the intermediate chamber, as in electrolysis, being subdivided into an acid, a base and, if desired, one or two salt compartments by at least one, if suitable, even two or three, ion exchange membranes.

A further development of the electrodialytical process described in the above-mentioned SU-A - 701 961 can be taken from SU-A - 916 601; yet, in order to achieve a better rate of decomposition of $Na_2SO_4$ into its decomposition products, five three-compartment electrodialyzers plus one two-compartment electrolyzer are connected in a manner so as to be consecutively passed by the electrolytic solutions, the $Na_2SO_4$ solution being conducted through the intermediate compartment of the electrodialyzers. Anion and cation exchange membranes are used as the membranes.

In addition to the desired increase in the decomposition rate from 40% with a single cell ) to 96–97%, also an increase in the current yield from 40–46% to 70% is automatically achieved.

All the electrodialytic processes known have the disadvantage that their current yield is relatively low and that damage to the membranes is frequent in the electrodialysis of alkali sulfate solutions containing alkaline earth ions, such as spent spin bath liquors from the xanthogenate process. Hence, the service lives of individual apparatus parts are undesiredly short.

SUMMARY OF THE INVENTION

It is the aim of the present invention to provide an improved electrodialytic process that does not involve such disadvantages.

With a process of the initially defined kind, this aim is achieved in that the alkali sulfate-containing aqueous solutions exclusively are conducted through acid compartments of the electrodialytic cells, which electrodialytic cells exclusively comprise cation exchange membranes in their interiors and are delimited by bipolar ion exchange membranes. An acid compartment, is understood to be any compartment whose electrolytic solution decreases in terms of pH during dialysis.

A preferred embodiment of the process according to the invention is characterized in that the first stage of electrodialysis is run in a two-compartment electrodialytic cell and each additional stage is carried out in a three-compartment electrodialytic cell, the acid and base compartments of the two-compartment electrodialytic cell typically being supplied with concentrated aqueous $Na_2SO_4$ solution and with dilute alkaline lye, preferably containing between 1.5 and 2% by mass alkali hydroxide, respectively, and these solutions are electrodialyzed to a maximum concentration of 10% by mass sulfuric acid and alkali hydroxide, respectively, in the first stage.

It has been proven that the pH gradient between acid and base compartments, up to this value, is not that large that undesiredly high current yield losses will occur as a result of the recombination of $H_3O^+$ and $OH^-$. By using a two-compartment cell instead of a three-compartment cell, it is possible to further reduce both the investment costs and the IR losses for the process according to the invention.

The electrolytic solution obtained after the first stage from the acid and base compartments subsequently are further dialyzed in at least one three-compartment cell, each in the respective compartment. At the same time, the intermediate compartment, which is present in a three-compartment cell, is fed with a nearly saturated aqueous alkali sulfate solution. In occasionally present additional stages, the electrolytic solutions from the three compartments are further dialyzed in respective analogous compartments in the same manner. Finally, in the last stage, dialysis takes place to the desired final concentration, whereupon the end products are withdrawn from the acid and base compartments. The electrolyte from the intermediate compartment may be fed into the acid compartment of the first cell.

For the step-wise electrodialysis of, in particular, spent spin bath liquors incurred in the production of regenerated cellulose according to the xanthogenate process, it has proved beneficial to pass the solutions exclusively through the acid compartments of three-compartment electrodialytic cells.

Such spin-bath liquors contain alkaline earth ions, which frequently cause damage to dialytic membranes in the electrodialytic processes known today, the membrane contacted by the alkaline lye being jeopardized.

It has been proven that the $Ca^{2+}$ contained in the spin bath, which migrates into the intermediate compartment during dialysis, constitutes a danger to the membrane if the concentration exceeds 3 ppm. The process according to the invention is feasible in a manner that this value is attained only in the final dialysis stage, the risk of damage to the membrane, thus, being limited to the last cell.

The aim of the present invention can be achieved by carrying out the process according to the invention in two or three stages.

The invention also relates to apparatus for carrying out the process, comprising a plurality of electrodialytic cells operating in series, each having an acid compartment and a base compartment and a cation exchange membrane, the analogous compartments of the individual cells being in flow-connection, a discharge line for dilute sulfuric acid being provided at the acid compartment and a discharge line for alkaline lye being provided in both cases at the base compartment of the last cell in series, which apparatus is characterized in that an acid compartment of the first cell of the series comprises a feed line for alkali sulfate-containing aqueous solutions and the base compartment of the first cell comprises a feed line for dilute alkaline lye, and that all of the eletrodialytic cells exclusively possess cation exchange membranes in their interiors and are delimited by bipolar ion exchange membranes.

Preferably, the analogous compartments of the individual cells are flow-connected via circulation reservoirs (tanks) receiving the electrolyte of the respective stage. These tanks facilitate the large-scale control of the process according to the invention. A circulation reservoir (tank) of the last cell of the series may be flow-connected with a circulation reservoir of the first or second cell.

Preferred embodiments of the apparatus according to the invention comprise two or three stages, where in a two-compartment electrodialytic cell is provided, in particular, as the first stage and three-compartment electrodialytic cells are provided as the second and third stages.

BRIEF DESCRIPTION OF THE DRAWINGS

The invention will be explained in more detail by way of three embodiments and with reference to the accompanying drawings, wherein FIGS. 1 to 3 schematically illustrate the electrolyte flow in two-stage (FIG. 1) and two three-stage (FIGS. 2 to 3) apparatus according to the invention, FIGS. 1 and 2 depicting the combination of a two-compartment with one and two three-compartment electrodialytic cells and FIG. 3 representing the combination of three three-compartment cells.

DETAILED DESCRIPTION OF THE INVENTION

In the Figures, the electrodialytic cells of the first, second and, if present, third stages are denoted by 1 and 2 and by 1, 2 and 3, respectively. Each of the cells illustrated is delimited by two bipolar ion exchange membranes — +, while, within the cell, the individual compartments are formed by at least one cation exchange membrane +. The electrodes are denoted by A, meaning anode, and by K, meaning cathode. $AT_{1-3}$, $LT_{1-3}$ and $ST_{1-3}$ indicate the acid, lye and salt tanks (circulation reservoirs) of the individual dialytic stages, which serve as storage tanks. The direction of the electrolytic flow between and in the individual stages is abdicated by arrows. The feed lines of the alkali sulfate containing aqueous solutions and for the dilute alkaline lye are denoted by 6 and 7, respectively.

Figure 1:
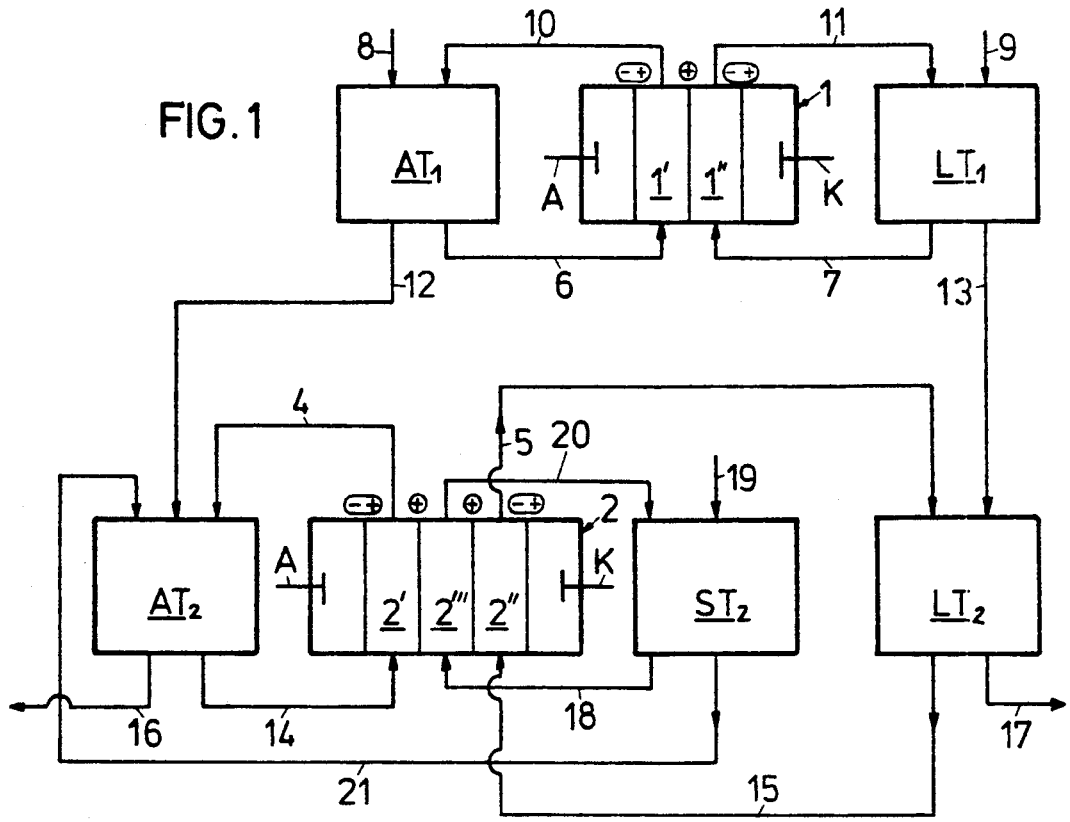

In FIG. 1, a two-stage variant of the process according to the invention is illustrated, the first stage being run in a two-compartment cell and the second stage being run in a three-compartment cell. At first, the acid tank $AT_1$ and the lye tank $LT_1$ are fed with the alkali sulfate solution to be split and with dilute alkaline lye, respectively, via inlets 8 and 9. These solutions are continuously recirculated through acid compartment 1' and base compartment 1" via feed lines 6 and 7 and discharge lines 10 and 11, respectively, and are electrodialyzed until a predetermined value is reached.

After this, the two electrolyte solutions are discharged into the respective acid tank $AT_2$ and lye tank $LT_2$ of the second stage (12, 13), are recirculated (14, 15) through acid compartment 2' and lye compartment 2" and are further dialyzed to the desired final concentration with the electrolytic solutions again being circulated, i.e., conveyed to the cell via lines 14 and 15 and recycled via lines 4 and 5. As soon as the desired final concentration has been reached, the dilute sulfuric acid and the alkaline lye are drawn off the tanks $AT_2$ and $LT_2$ (16, 17).

Prior to carrying out the second stage, the salt tank $ST_2$ is charged with aqueous alkali sulfate solution through i n l e t 19 and the solution is constantly circulated (18, 20) through the intermediate compartment 2''' during dialysis. With dialysis proceeding, the electrolyte of the intermediate compartment gets enriched with $H_2SO_4$. After dialysis, the intermediate compartment electrolyte is removed from salt tank $ST_2$ and conveyed (21) to acid tank $AT_2$, where it is utilized together with the subsequent batch from acid tank $AT_1$.

Figure 2:
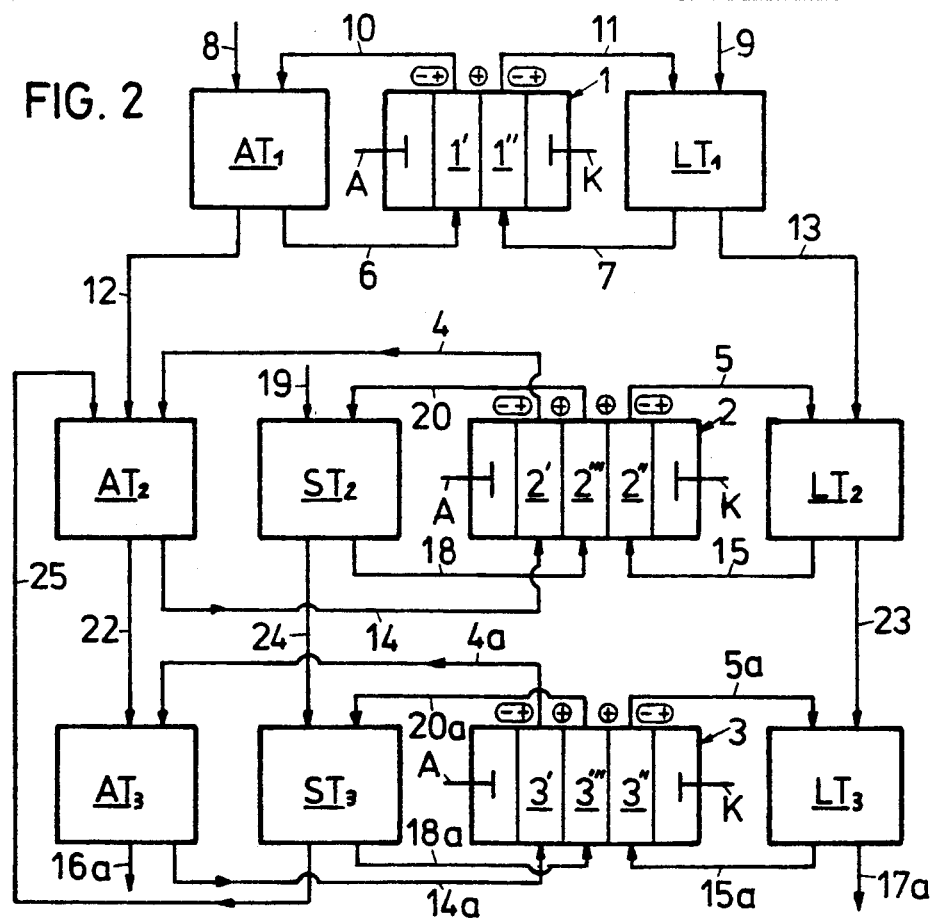

FIG. 2 illustrates a three-stage variant of the process according to the invention, the first stage being run in a two-compartment cell and the second and third stages being realized in three-compartment cells. In the first two stages, the electrolyte flow takes place in a manner analogous to the variant illustrated in FIG. 1. To accomplish the third stage, the electrolyte, after having reached the desired acid and lye concentrations in tanks $AT_2$, $LT_2$, $ST_2$, is drawn off these tanks and fed (22, 23, 24) into the respective tanks $AT_3$, $LT_3$ and $ST_3$ of the third stage. The electrolyte flow in the third stage corresponds to that of the second stage, the tubing of the third stage being denoted by the same reference numerals as the second stage supplemented by the index "a" in FIG. 2.

After the desired final concentration of the electrolytes in tanks $AT_3$, $LT_3$, $ST_3$ has been reached, the third stage is stopped and the end products from tanks $AT_3$ and $LT_3$ are drawn off. The electrolyte from salt tank $ST_3$ is introduced into acid tank $AT_2$ of the second stage and is dialyzed together with the product from acid tank $AT_1$.

Figure 3:
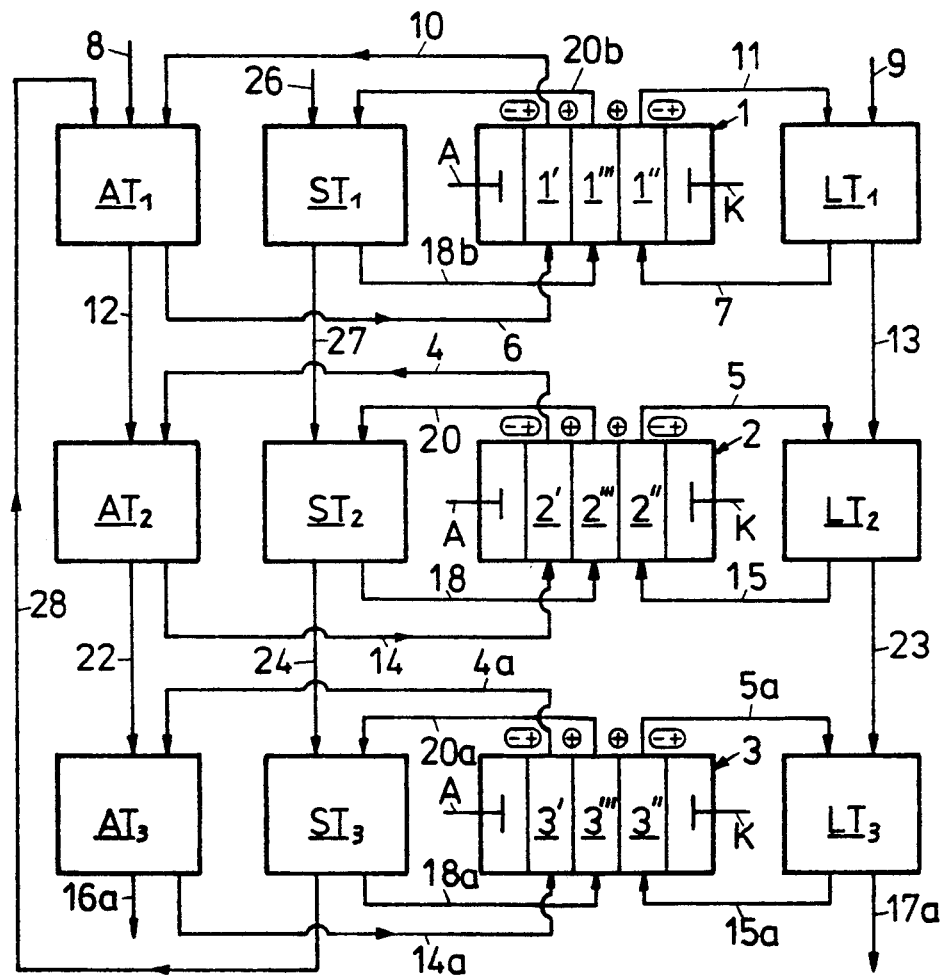

FIG. 3 shows a three-stage variant of the process according to the invention, wherein all the three stages are carried out in three-compartment cells. The electrolyte flow substantially occurs as described in FIG. 2. Salt tank $ST_1$ is charged with alkali sulfate solution via inlet 26. During the first stage of dialysis, this alkali sulfate solution is continuously conducted (18b, 20b) through intermediate compartment 1''' and then is bled (27) into salt tank $ST_2$. According to the variant illustrated in FIG. 3, which is particularly suited to process spent spin bath liquors, the electrolyte solution from salt tank $ST_3$, after completion of the third stage, is introduced (28) into acid tank $AT_1$ of the first stage and is processed together with the subsequent batch of spin bath liquor.

EXAMPLE 1

An electrodialytic apparatus as represented in FIG. 1 was used, the two stages being designed not as individual cells, but as cell stacks. Cell stacks are multiple cells assembled by consecutively arranging individual cells between the two electrodes in a known manner.

The cell stacks used were obtained from Aquatech Systems, N.J., U.S.A., each comprising 8 cells having an active surface of 103 $cm^2$ per membrane.

The current supply of the individual stacks was effected via a rectifier in a manner that a current density of constantly 10 $A/dm^2$ was maintained. The electrolytic solutions were heated such that a temperature of 45° C. was reached within the cell stacks. All of the cell stacks were batch-operated by circulating the electrolytes to be dialyzed through the stack via the respective tanks until the desired concentrations had been reached. The product solutions thus obtained were drawn off the circulatory systems, the latter being charged with new starting solutions.

The acid tank of the first cell stack was charged with a nearly saturated $Na_2SO_4$ solution and the lye tank was charged with 1.4% by weight NAOH solution.

After 24 hours of electrodialysis, the 7.3 & $H_2SO_4$ and the 6.2% NAOH obtained were bled into the respective tanks of the following stage 2. Simultaneously with the 7.3% $H_2SO_4$ from the first stage, also the electrolyte from the intermediate compartment of the second stage of the preceding test run were conveyed into the acid tank.

The tank of the intermediate compartment circulation was newly charged with fresh 27$Na_2SO_4$ solution.

After 48 hours of electrodialysis, the end products containing about 12% $H_2SO_4$ and 12% NaOH were drawn off the acid and lye tanks, respectively.

The product forming in the intermediate compartment, containing 8.6% $H_2SO_4$, was conveyed into acid tank $AT_2$ in the subsequent batch according to the mode of procedure just described.

Quantitative balance:

1st cell stack (two-compartment cell):
Input amounts:
Acid circulation: 43.7 kg 27% $Na_2SO_4$
Lye circulation: 46.5 kg 1.4% NaOH
Output amounts:
Acid circulation: 41.2 kg 7.1% $H_2SO_4$ 18.4% $Na_2SO_4$
Lye circulation: 49.2 kg 6.2% NaOH
Current yield: 81.3%

2nd cell stack (three-compartment cell):
Input amounts:
Acid circulation: Product from acid circulation of 1st cell stack (s.a.) + product from intermediate compartment circulation of 2nd cell stack of preceding test run (27.8 kg 7.5% $H_2SO_4$, 21.4% $Na_2SO_4$).
Interm. compt. circ.: 33.0 kg 27.4% $Na_2SO_4$
Lye circulation: Product from lye circulation of 1st cell stack (s.above)
Output amounts: 64.8 kg 11.9% $H_2S_4$ 14% $Na_2SO_4$,
Acid circulation: 27.6 kg 7.6% $H_2SO_4$ 21.6% $Na_2SO_4$
Interm. compt. circ.: 56.4 kg 12.3% NaOH
Lye circulation: 65.9%
Current yield:
Avg current yield: 71.0%
Avg voltage per cell: 1.95 V
Current demand: 1.84 kWh/kg NaOH

EXAMPLE 2

Electrodialytic apparatus comprised a total of three cell stacks arranged in series according to the diagram illustrated in FIG. 2.

All of the three cell stacks were obtained from Aquatech Systems, N.J., U.S.A.), each including eight cells having an active surface of 103 cm$^2$ each. The first cell stack was assembled according to the two-compartment system, the second and third cell stacks were assembled according to the three-compartment system.

Analogous to Example 1, the individual stacks were fed from a rectifier with a constant current density of 10 A/dm$^2$, the temperature within the cells being maintained at 45° C. by thermostating the electrolytic solutions. Again, all the cell stacks were operated in batches by dialyzing the solution to be split until the desired partial conversion had been reached.

According to the flow chart of FIG. 2, the first cell stack again was charged with the same solutions and quantities and was concentrated to the same acid and base contents within 24 hours as in Example 1; i.e., 1.4% soda lye was concentrated to 6.2% and 27% Na$_2$SO$_4$ solution was dialyzed to a content of 7.3% H$_2$SO$_4$.

Further processing of the solutions was effected in two consecutively arranged three-compartment electrodialyzers as a variation of the procedure described in Example 1: the 6.2% NAOH recovered from the lye circulation of the first stage was transferred to that of the second stage. The 7.1% H$_2$SO$_4$ obtained from the acid circulation of the first stage, in turn, was conveyed to that of the second stage and, simultaneously therewith, also the intermediate compartment product from the third stage, which contained 7.2% H$_2$SO$_4$.

29% Na$_2$SO$_4$ solution was fed into the intermediate compartment circulation of the second stage.

After 24 hours of electrodialysis, the solutions thus obtained from the second stage were supplied to the respective circulation systems of the third stage, where they were finally brought to the desired final concentration within further 24 hours, i.e., to about 12% NaOH and about 12% H$_2$SO$_4$; the product formed in the intermediate compartment containing 7.2% H$_2$SO$_4$ was transferred to the acid circulation of the second stage in the subsequent batch according to the mode of procedure described.

Quantitative balance:

1st cell stack (two-compartment cell):
Input amounts:
| | | |
|---|---|---|
| Acid circulation: | 43.7 kg | 27% Na$_2$SO$_4$ |
| Lye circulation: | 46.5 kg | 1.4% NaOH |

Output amounts:
| | | | |
|---|---|---|---|
| Acid circulation: | 41.2 kg | 7.1% H$_2$SO$_4$ | 18.4% Na$_2$SO$_4$ |
| Lye circulation: | 49.2 kg | 6.2% NaOH | |
| Current yield: | 81.3% | | |

2nd cell stack (three-compartment cell):
Input amounts:
Acid circulation: Product from acid circulation of 1st cell stack (s.a) + product from intermediate compartment circulation of 3rd cell stack of preceding test run (27.4 kg 7.3% H$_2$SO$_4$)
Interm. compt. circ.: 33.0 kg 29% Na$_2$SO$_4$
Lye circulation: Product from lye circulation of 1st cell stack (s.above)

Output amounts:
| | | |
|---|---|---|
| Acid circulation: | 65.3 kg | 10.3% H$_2$SO$_4$ |
| Interm. compt. circ.: | 30.7 kg | 2.8% H$_2$SO$_4$ |
| Lye circulation: | 53.2 kg | 9.8% NaOH |
| Current yield: | 73.2% | |

3rd cell stack (three-compartment cell):
Input amounts:
Acid circulation ⎫
Intermed. compt. circ. ⎬ Products from the respective circulations of 2nd cell stack
Lye circulation ⎭

Output amounts:
| | | |
|---|---|---|
| Acid circulation | 64.5 kg | 12.3% H$_2$SO$_4$ |
| Intermed. compt. circ. | 27.4 kg | 7.3% H$_2$SO$_4$ |
| Lye circulation | 57.0 kg | 12.5% NaOH |
| Current yield: | 57.1% | |
| Avg current yield: | 70.5% | |
| Avg voltage per cell: | 1.94 V | |
| Current demand: | 1.84 kWh/kg NaOH | |

EXAMPLE 3

Electrodialytic apparatus comprised three cell stacks connected in series, as is illustrated in FIG. 3. The cell stacks used were obtained from Aquatech Systems/N.J., U.S.A. and were identical both in terms of structure and in terms of dimension and number of cells. They comprised eight cells assembled according to the three-compartment cell principle, the membranes delimiting the individual compartments being composed of a bipolar, a cation and another cation membrane. The active surface per membrane was about 103 cm$^2$.

Current density and temperature were equal in all of the modules, i.e., 10.4 A/dm$^2$ and 45° C. Again, all the cell stacks were operated in batches, the solutions to be dialyzed being circulated through the stack via a reservoir until the desired partial conversion had been reached.

According to the flow chart illustrated in FIG. 3, the first cell stack was charged with the starting solutions, i.e., the lye tank with 1.5% soda lye, the salt tank with 27% Na$_2$SO$_4$ solution and the acid tank with 4.3% H$_2$SO$_4$-containing spin bath liquor; at the same time, also the intermediate compartment product from the third cell stack of the preceding test run was additionally fed into the acid tank.

After 7 hours of dialysis, the thus obtained solutions, which were enriched with acid or lye, respectively, were conveyed from the respective tanks of the first stage into the respective tanks of the second stage, there being electrodialyzed for further 7 hours and even more concentrated with acid or lye, respectively.

Then, the solutions were supplied to the third stage in an analogous manner, where they finally were brought to the final concentration within further 7 hours: This was 12.2% with the lye, 12.0% H$_2$SO$_4$ with the product withdrawn from the acid compartment. The product leaving the intermediate compartment and containing 8.2% H$_2$SO$_4$ was mixed with the spin bath liquor in the subsequent run and fed into the acid compartment of the first cell stack.

Quantitative balance:

1st cell stack
Input amounts:
| | |
|---|---|
| Acid circulation: | 16.1 kg spin bath (4.3% H$_2$SO$_4$, 20.2% Na$_2$SO$_4$, 10 ppm Ca) + intermed. compt. end product from cell stack 3 of preceding run |
| Intermed. compt. circ.: | 13.0 kg 27% Na$_2$SO$_4$ |
| Lye circulation: | 14.0 kg 1.5% NaOH |

3rd cell stack
Output amounts:
| | | |
|---|---|---|
| Acid circulation: | 25.3 kg | 12.0% H$_2$SO$_4$, 15.1% Na$_2$SO$_4$ |
| Intermed. compt. circ.: | 10.1 kg | 8.2% H$_2$SO$_4$, 23.6% Na$_2$SO$_4$ |

| | |
|---|---|
| Lye circulation: | 17.6 kg  12.2% NaOH |

While the intermediate compartment solution in the last cell stack had already reached the critical concentration of 2.8 ppm Ca, the concentrations in the first and second cell stacks still were within the safe range, amounting to 2.0 and 1.1. ppm Ca, respectively.

| | |
|---|---|
| Avg current yield: | 71.8% |
| Avg voltage per cell: | 2.0 V |
| Current demand: | 1.87 kWh/kg NaOH |

EXAMPLE 4

The same electrodialytic apparatus as illustrated in FIG. 3 was used, yet the salt tank $ST_3$ was not in flow-connection with the acid tank $AT_1$.

The cell stacks used were obtained from Aquatec Systems/N.J., U.S.A. and were the same as in the preceding Example 3, also the current density and the temperature were equal in all of the modules, i.e., 10.4 A/dm² and 45° C.

According to the flow chart illustrated in FIG. 3, the first cell stack was charged with the starting solutions, i.e., with 1.5% soda lye and 4.2% $H_2SO_4$ containing spin bath liquor as well as with 27% $Na_2SO_4$ solution as the flushing solution (intermediate compartment). After 6 hours of dialysis the solutions enriched with acid or lye were drawn off the acid and lye circulations, respectively, and $Na_2SO_4$ flushing solution was removed from the intermediate compartment circulation and transferred to the respective circulation systems of the second cell stack, there being subjected to another 6 hour dialysis. After this, the solutions were conveyed into the third stack, where the acid and lye finally were brought to the desired final concentrations of 7.4 and 14.5%, respectively.

The buffer solution (flushing solution), which has remained substantially neutral, was freed from the Ca ions migrated thereinto at a concentration of 2.5 ppm by means of an ion exchanger and was reused as a flushing solution for the subsequent batch in the first cell stack after supplementation of the water losses.

| | |
|---|---|
| Quantitative balance | |
| 1st cell stack | |
| Input amounts: | |
| Acid circulation: | 63 kg spin bath (4.2% $H_2SO_4$, 20.0% $Na_2SO_4$ 25 ppm Ca) |
| Intermed. compt. circ.: | 63 kg  27% $Na_2SO_4$ |
| Lye circulation.: | 8.5 kg  1.6% NaOH |
| 3rd cell stack | |
| Output amounts: | |
| Acid circulation: | 62.6 kg  7.4% $H_2SO_4$  17.3% $Na_2SO_4$ |
| Intermed. compt. circ.: | 59.3 kg  27% $Na_2SO_4$  0% $H_2SO_4$ |
| Lye circulation: | 12.3 kg  14.5% NaOH |

While the intermediate compartment solution in the third cell stack had already reached a critical concentration of 2.5 ppm Ca, the concentrations in the first and second cell stacks still were in the safe range, amounting to 1.0 and 1.8 ppm, respectively.

| | |
|---|---|
| Avg current yield: | 71.7% |
| Avg voltage per cell: | 2.28 V |
| Current demand | 2.13 kWh/kg NaOH |

What we claim is:

1. A multistage process for the electrodialysis of a spent spin bath liquor incurred in the production of regenerated cellulose by way of the xanthogenate process, said liquor containing alkali sulfate and $Ca^{++}$, comprising the steps of providing a plurality of electrodialytic three-compartment cell means operating in series, each cell means comprising acid and base compartments and two exclusively cationic exchange membranes in the cell interior, and being delimited by bipolar ion exchange membranes, conducting said liquid exclusively through first acid compartments of said cell means in series, each of said first acid compartments being delimited by one of the bipolar ion exchange membranes and one of the exclusively cationic exchange membranes in its respective cell means, simultaneously conducting concentrated aqueous $Na_2SO_4$ solution through second acid compartments of said cell means in series, each of said second acid compartments being delimited by two exclusively cationic exchange membranes in its respective cell means, thereby acidifying said $Na_2SO_4$ solution and thereby migrating $Ca^{++}$ from said first acid compartment through one of said exclusively cationic exchange membranes into said concentrated aqueous $Na_2SO_4$ solution in said second acid compartment to a concentration of 3 ppm or less, and feeding said acidified $Na_2SO_4$ solution containing $Ca^{++}$ in a concentration of 3 ppm or less into said first acid compartment of the first of said series operating cell means.

2. The process according to claim 1 wherein said electrodialysis comprises two stages.

3. The process according to claim 2 wherein said electrodialysis comprises three stages.

* * * * *

UNITED STATES PATENT AND TRADEMARK OFFICE
CERTIFICATE OF CORRECTION

PATENT NO. : 5,294,316

DATED : March 15, 1994

INVENTOR(S) : Schmidt, et al.

It is certified that error appears in the above-indentified patent and that said Letters Patent is hereby corrected as shown below:

Col. 2, line 59, "40% with" should read --40% (with--;

Col. 4, line 30, "where in" should read --wherein--;

Col. 4, line 62, "abdicated" should read --indicated--;

Col. 5, line 23, "i n l e t 19" should read --inlet 19--;

Col. 6, line 25, "NAOH" should read --NaOH--;

Col. 6, line 26, 7.3 &" should read --7.3%--;

Col. 6, line 27, "NAOH" should read --NaOH--;

Col. 6, line 34, "27Na$_2$SO$_4$" should read --27% Na$_2$SO$_4$--;

Col. 6, line 61, "H$_2$S$_4$" should read --H$_2$SO$_4$--;

Col. 7, line 28, "NAOH" should read --NaOH--;

Col. 10, line 31, "liquid" should read --liquor--;

UNITED STATES PATENT AND TRADEMARK OFFICE
CERTIFICATE OF CORRECTION

PATENT NO. : 5,294,316
DATED : March 15, 1994
INVENTOR(S) : Schmidt, et al.

It is certified that error appears in the above-indentified patent and that said Letters Patent is hereby corrected as shown below:

Col. 10, line 55, "claim 2" should read --claim 1--.

Signed and Sealed this

Thirtieth Day of May, 1995

Attest:

BRUCE LEHMAN

Attesting Officer

Commissioner of Patents and Trademarks